UNITED STATES PATENT OFFICE.

JESSE BECKLEY, OF CINCINNATI, OHIO.

IMPROVED COMPOSITION FOR SEALING PRESERVE-JARS.

Specification forming part of Letters Patent No. 39,111, dated July 7, 1863.

*To all whom it may concern:*

Be it known that I, JESSE BECKLEY, of Cincinnati, Hamilton county, Ohio, have invented a new and useful Composition for Sealing Provision-Jars; and I do hereby declare the following to be a full, clear, and exact description thereof.

The object of this invention is to provide for the hermetical sealing or closing of jars and other preserving-vessels a composition not liable to crack open either by the influence of atmospheric changes or the ordinary accidents of transportation—one also substantially exempt from noxious scent, entirely innocuous, and extremely cheap.

The above desiderata I have very effectually supplied by the following composition:

Take common coal-tar and boil the same for about twelve hours. To every hundred pounds of inspissated tar thus obtained I add, by stirring, thirty-seven pounds of common beeswax. The composition being then run into molds to cool is ready for use.

The benzole and other volatiles may be collected and preserved in the ordinary way.

I claim herein as new and of my invention—

The composition for sealing preserve-jars, composed and compounded as set forth.

In testimony of which invention I hereunto set my hand.

JESSE BECKLEY.

Witnesses:
 GEO. H. KNIGHT,
 JAMES H. LAYMAN.